United States Patent
Jones et al.

(10) Patent No.: US 7,277,710 B1
(45) Date of Patent: Oct. 2, 2007

(54) METHOD FOR DETERMINING AVAILABILITY OF A RADIO NETWORK

(75) Inventors: Bryce A. Jones, Overland Park, KS (US); Jason R. Delker, Olathe, KS (US); John M. Everson, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1024 days.

(21) Appl. No.: 10/391,158

(22) Filed: Mar. 18, 2003

(51) Int. Cl.
*H04Q 7/20* (2006.01)

(52) U.S. Cl. .......... 455/456.1; 455/433; 455/435.2; 455/440; 455/444; 455/456.2; 455/456.6

(58) Field of Classification Search .......... 455/404.2, 455/432.1–444, 456.1, 456.2, 456.5, 456.6
See application file for complete search history.

(56) References Cited

U.S. PATENT DOCUMENTS

| | | | |
|---|---|---|---|
| 5,737,703 A | 4/1998 | Byrne | 455/442 |
| 5,983,109 A * | 11/1999 | Montoya | 455/456.2 |
| 6,108,533 A * | 8/2000 | Brohoff | 455/414.3 |
| 6,438,117 B1 | 8/2002 | Grilli et al. | 370/331 |
| 6,445,912 B1 * | 9/2002 | Cole et al. | 455/406 |
| 6,680,923 B1 | 1/2004 | Leon | 370/328 |
| 2001/0036830 A1 | 11/2001 | Wu et al. | 455/436 |
| 2003/0091021 A1 | 5/2003 | Trossen et al. | 370/349 |
| 2003/0118015 A1 | 6/2003 | Gunnarsson et al. | |
| 2003/0134636 A1 | 7/2003 | Sundar et al. | |
| 2004/0176024 A1 | 9/2004 | Hsu et al. | |
| 2004/0176101 A1* | 9/2004 | Shoki et al. | 455/456.1 |

* cited by examiner

*Primary Examiner*—Harry S. Hong

(57) ABSTRACT

A mobile station may determine its present location. The mobile station may then access a database, which correlates the mobile station's present location with a coverage area of a radio network. If the database indicates that the mobile station is within the coverage area of the radio network, the mobile station may then attempt to access the radio network and determine the radio network's availability.

26 Claims, 9 Drawing Sheets

METHOD FOR DETERMINING AVAILABILITY OF A RADIO NETWORK

FIELD OF THE INVENTION

This invention relates generally to radio networks. More specifically it relates to a method for determining the availability of a radio network.

BACKGROUND OF THE INVENTION

A mobile station may communicate with a first radio access network, such as an Institute of Electrical and Electronics Engineers ("IEEE") 802.11 network or other radio network. The mobile station may communicate with other devices on the radio network. The radio network may additionally provide connectivity to one or more packet data networks, thereby allowing the mobile station to also communicate with devices on other packet data networks.

In addition to the first radio network, the mobile station may also communicate with a second radio network, such as a wireless wide area network ("WWAN"). The mobile station may connect to the second radio network and then communicate with another device on the second radio network. The second radio network may additionally provide connectivity to one or more packet data networks, and the mobile station may also communicate with devices on these other networks.

In order to communicate with one of the radio networks, the mobile station generally first detects the radio network's availability. If the radio network is available, then the mobile station would be able to communicate with the radio network. Given a choice between the two radio networks, it may be preferable for the mobile station to communicate with one network over the other. For example, the first radio network may provide a higher data rate than the second radio network, thereby making it more preferable to communicate with the first radio network. Thus, even when the mobile station is communicating with the second radio network, the mobile station may still want to determine the availability of the first radio network so that the mobile station can switch from communicating with the second radio network to communicating with the first radio network.

Current methods for detecting the availability of a radio network have various limitations. In one method of detecting the availability of a radio network, a user of the mobile station manually prompts the mobile station to check the availability of the radio network. For example, in response to a command from the user, the mobile station may check for the availability of the radio network. This can disadvantageously create a delay in detecting the availability of the radio network, because while the mobile station may be within range of the radio network it would only detect the radio network in response to a command from the user. If the user delays in making a request to check for the network, then the mobile station would be delayed in detecting the network's availability. If the user does not make a request, then the mobile station would never detect the radio network's availability.

In another method of detecting the availability of the radio network, the mobile station may automatically check for the availability of the radio network, such as at predetermined time intervals. The mobile station may include, for example, a radio or other transceiver that the mobile station uses to communicate with the radio network. In order to check for the availability of the radio network, the mobile station may power-up the radio and then use the radio to attempt to communicate with the radio network. If the radio network is not available, the mobile station may power-down the radio until the next predetermined interval when the mobile station again checks for the availability of the radio network.

Checking for the radio network's availability in this manner can allow the mobile station to quickly detect when the radio network becomes available, because the mobile station would be periodically checking for the radio network's availability. Powering-up a radio in the mobile station in order to check for the availability of the radio network, however, consumes power. As mobile station typically run on batteries, checking the radio network's availability in this manner can more quickly deplete the mobile station's battery.

Therefore, there exists a need for an improved method for determining the availability of a radio network.

SUMMARY OF THE INVENTION

A mobile station may detect the availability of a radio network. The mobile station may use its current location to aid in determining the availability of the radio network. For example, the mobile station may first determine its present location. The mobile station may then access a database or other data storage structure that correlates various locations with a coverage area of the radio network. Using the database, the mobile station can determine whether the mobile station's current location corresponds to a coverage area of the radio network.

If the database indicates that the mobile station is within the coverage area of the radio network, the mobile station may then power-up a radio that the mobile station uses to communicate with the radio network. Using the radio, the mobile station may then attempt to communicate with the radio network, such as to determine the radio network's availability and to then access the radio network. If the radio network is available, the mobile station may then begin communicating with the radio network.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Overview

Figure 1:
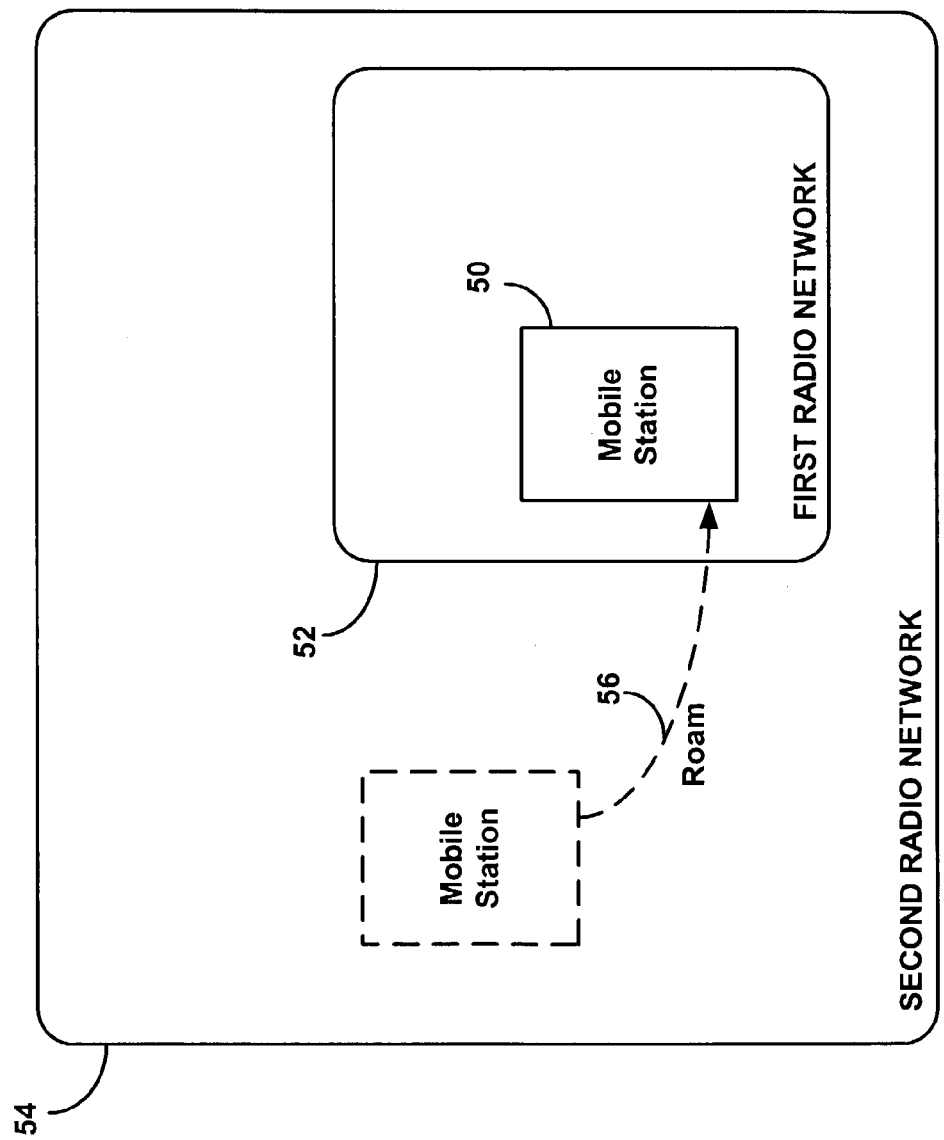
FIG. 1 is an exemplary illustration of a mobile station 50 that can communicate with first and second radio networks.

FIG. 1 is an exemplary illustration of a mobile station 50 that can communicate with first and second radio networks. The mobile station 50 may communicate with a first radio network 52, such as an 802.11 WLAN. The mobile station may also communicate with a second radio network 54, such as a WWAN. The mobile station 50 may access one of the radio networks 52, 54 in order to communicate with a device on one of the radio networks 52, 54. The radio networks 52, 54 may provide additional connectivity that allow the mobile station 50 to communicate with a device on another network, such as another packet data network.

As shown by a dashed line 56, the mobile station 50 may roam from a position outside the coverage area of the first radio network 52 to a position inside the coverage area of the first radio network 52. For example, as shown in FIG. 1, the mobile station 50 may roam from a location covered by only the second radio network 54 to a location covered by both the radio networks 52, 54. Once inside the coverage area of the first radio network 52, the mobile station 50 can communicate via the first radio network 52; however, the mobile station 50 must first determine that it is within the coverage area of the first radio network 52.

The mobile station 50 can use location information to aid in determining whether the mobile station 50 is within the coverage area of the first radio network 52. For example, the mobile station 50 may first determine its present location. This may be done, for example, using an existing connection with the second radio network 54, a global positioning system ("GPS") receiver in the mobile station 50 or other methods. The mobile station 50 may then access a database, a data file or other data storage structure that correlates the mobile station's present location with a coverage area of the first radio network 52. If the database indicates that the mobile station 50 is within the coverage area of the first radio network 52, the mobile station may then power-up a radio used to communicate with the first radio network 52 and attempt to access the first radio network 52.

If the mobile station 50 successfully accesses the first radio network 52, then the mobile station 50 can begin communicating with the first radio network 52. If the mobile station 50 does not successfully access the first radio network 52, then the mobile station 50 can power-down the radio until the mobile station 50 makes a later determination that it may again be within the coverage area of the first radio network 52. Thus, the mobile station 50 can use the database to increase the likelihood that the mobile station 50 is within the coverage area of the first radio network 52 before powering-up the radio and attempting to communicate with the first radio network 52.

The mobile station 50 may use the techniques, for example, to switch between radio networks. For example, as depicted in FIG. 1, the mobile station 50 may currently be communicating with the second radio network 54. After the mobile station 50 roams to a coverage area of the first radio network 52, the mobile station 50 may detect the availability of the first radio network 52. Then, the mobile station 50 may begin arbitrating between the two radio networks 52, 54, such as by deciding whether to switch from communicating with the second radio network 54 to communicating with the first radio network 52.

Alternatively, the mobile station 50 may be out of range of both the radio networks 52, 54. The mobile station 50 may still use these techniques to detect the availability of one or both of the radio networks 52, 54. Still alternatively, the mobile station 50 may only be capable of communicating with one radio network, and the mobile station 50 may use these techniques to detect the availability of that radio network.

Using the database to make a preliminary determination as to the availability of the first radio network 52 before powering-up the radio and checking for the availability of the first radio network 52 can have several advantages. For example, using the preliminary determination may allow the mobile station 50 to more efficiently switch between radio networks 52, 54 in order to leverage the radio network with the highest data speed, lowest cost or some other preferable factor. In another example, using the database can reduce the number of times that the mobile station 50 powers-up the radio in order to check for the first radio network 52, thereby conserving the mobile station's battery power. Using the database can additionally reduce the computational overhead associated with checking for the availability of the first radio network 52 at periodic intervals. Other advantages may also exist.

2. Exemplary Architecture

Figure 2:
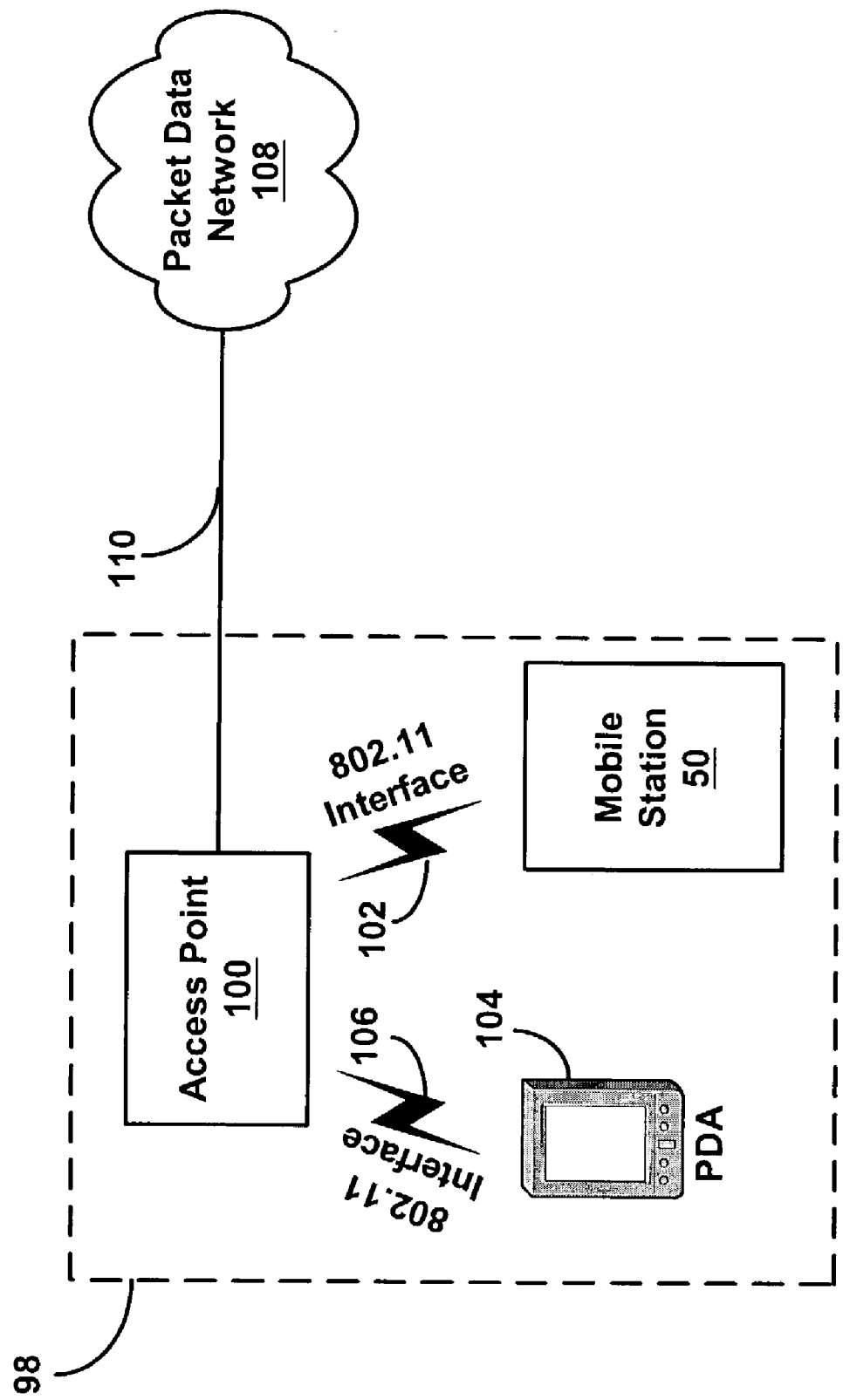
FIG. 2 is an exemplary WLAN that can be used as the first radio network of FIG. 1.

FIG. 2 is an exemplary WLAN that can be used as the first radio network of FIG. 1. The devices on the WLAN 98 may communicate using one or more of the various IEEE 802.11 standards. IEEE 802.11 specifies various signaling and formatting protocols that are used by devices on the WLAN 98. For example, IEEE 802.11 provides protocols for a physical ("PHY") layer, which is used to transmit bits of information over a wireless interface. IEEE 802.11 also provides for a media access control ("MAC") sub-layer, which can be used to format the bits sent over the wireless interfaces using one of the PHY layer protocols.

The WLAN 98 is depicted in a basic service set ("BSS") configuration. In the BSS configuration, one or more wireless nodes connect with an access point ("AP") 100. As depicted in FIG. 2, the WLAN 98 includes two wireless nodes. The mobile station 50 serves as one wireless node and communicates with the AP 100 over an 802.11 wireless interface 102. The mobile station 50 may be any number of different devices, such a mobile phone, two-way pager, two-way radio, personal digital assistant, Internet appliance, wirelessly-equipped computer or any other wireless device.

As depicted in FIG. 2, a personal digital assistant ("PDA") 104 serves as the second wireless node and communicates with the AP 100 over an 802.11 wireless interface 106. Other types of devices may also serve as wireless nodes. Although FIG. 2 only depicts two wireless nodes 50, 104, the WLAN 98 may include a greater or fewer number of wireless nodes.

In the BSS configuration, the wireless nodes 50, 104 can exchange data with each other through the AP 100. For example, the PDA 104 can send a message to the AP 100 via the 802.11 wireless interface 106, which is then relayed to the mobile station 50 via the 802.11 wireless interface 102.

Similarly, the mobile station 50 may send a message to the AP 100 via the 802.11 wireless interface 102, which is in turn relayed to the PDA 104 via the 802.11 wireless interface 106. Using this connectivity provided by the access point AP 100, the mobile station 50 and the PDA 104 can communicate with each other.

In addition to the BSS configuration, multiple APs can be linked together to form an extended services set ("ESS"). Thus, an ESS can include two or more BSSs. The APs can be linked in a variety of different manners, such as through a wired Ethernet connection. Once linked together, wireless nodes connected to one AP can exchange data with wireless nodes connected to a different AP. Additionally, a wireless node can roam among the different wireless access points in the ESS. Thus, an ESS configuration can extend the range of the WLAN 98 past that of a BSS configuration.

The AP 100 may in turn connect to a packet data network 108 via a data link 110. The data link 110 may be a wired or wireless connection. The packet data network 108 may be any type of packet data network, such as an intranet or the Internet. The packet data network 108 may additionally provide connectivity to one or more other packet data networks. Using the connectivity between the AP 100 and the packet data network 108, the mobile station 50 may communicate with a device on the packet data network 108.

The WLAN 98 depicted in FIG. 2 may use any of the various 802.11 standards. For example, it may use the 802.11a, 802.11b, 802.11 g or other standards under the 802.11 umbrella. It should be understood, however, that IEEE 802.11 is merely exemplary in nature. The first radio network 52 may use other radio protocols. For example, the radio network may alternatively be a HomeRF network, a HiperLAN, a Bluetooth network, a wireless telecommunications network or another type of radio network.

Figure 3:
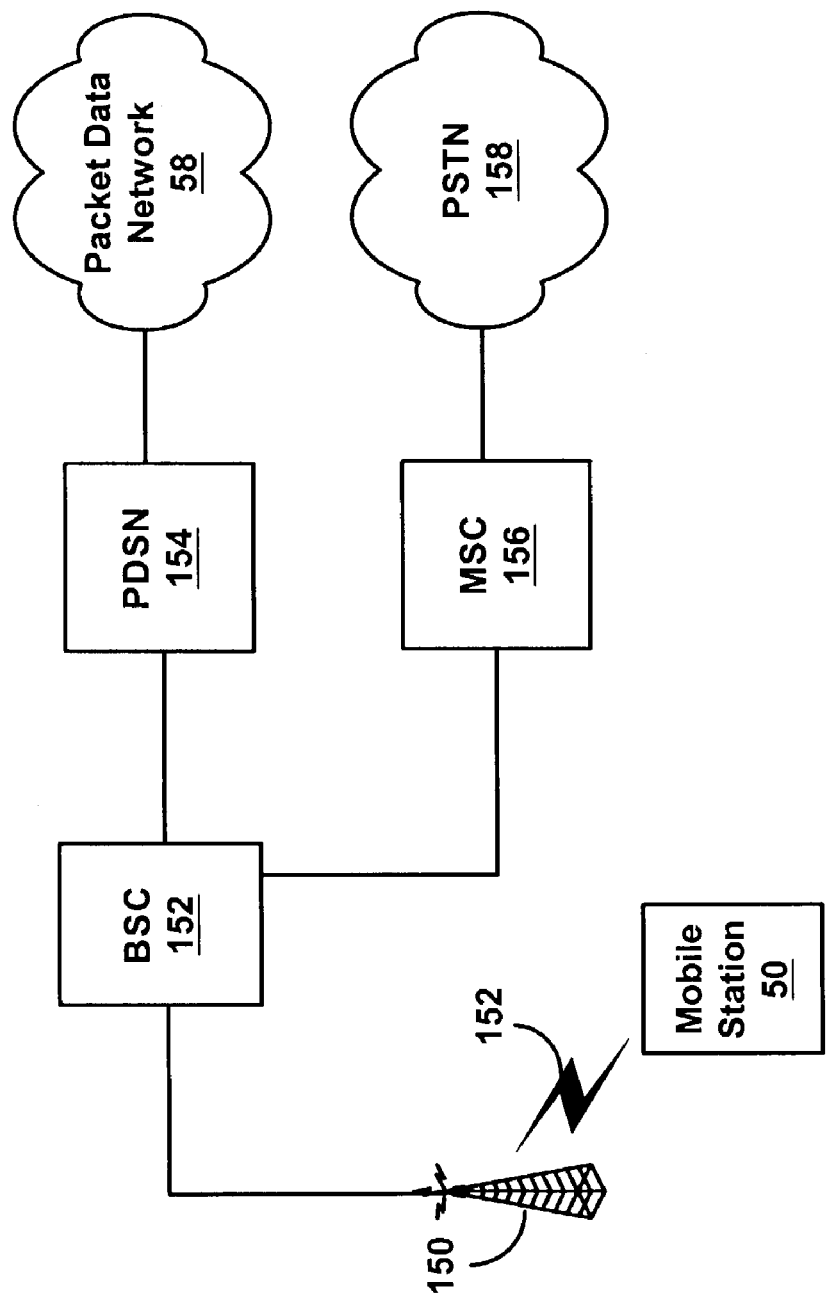
FIG. 3 shows an exemplary architecture for a wireless telecommunications network that can be used as the second radio network of FIG. 1.

FIG. 3 shows an exemplary architecture for a wireless telecommunications network that can be used as the second radio network of FIG. 1. As shown in FIG. 3, the mobile station 50 communicates with a base transceiver station ("BTS") 150 via an air interface 152. The mobile station 50 can communicate with the BTS 150 using a variety of different protocols. In one exemplary embodiment, the mobile station 50 communicates with the BTS 150 via the air interface 152 using Code Division Multiple Access ("CDMA").

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Other wireless protocols may also be used. For example, the mobile station 50 and the base station 150 may communicate using Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), IS-136, Time Division Multiple Access ("TDMA") or other protocols.

The BTS 150 connects to a base station controller ("BSC") 152, which in turn connects to a packet data serving node ("PDSN") 154. The PDSN 154 connects to the packet data network 58. Using this connectivity, the mobile station 50 may then communicate with devices on the packet data network 58. For example, mobile station 50 may access the wireless telecommunications network and establish a packet data session, such as can be done in a 3G wireless telecommunications network.

The mobile station 50 may establish the packet data session, for example, by establishing a point-to-point protocol ("PPP") session with the PDSN 154. The mobile station may optionally use higher-level protocols, such as Internet Protocol ("IP"), Transmission Control Protocol ("TCP"), Universal Datagram Protocol ("UDP") or other protocols to communicate with devices on the wireless telecommunications network or on the packet data network 58.

The mobile station 50 may connect to the wireless telecommunications network in other ways. For example, as can be done in a 2G wireless telecommunications network, the mobile station may establish a circuit-switched connection with an Internetworking Function ("IWF"). The IWF can convert between the circuit-switched connection with the mobile station 50 and a packet-switched connection with another device, such as one on the wireless telecommunications network or the packet data network 58.

Alternatively, the mobile station 50 may access the wireless telecommunications network by placing a traditional voice call. The BSC 152 may connect to a mobile switching center ("MSC") 156, which in turn may connect to the public switched telephone network ("PSTN") 158. The mobile station 50 may use this connectivity to form a circuit-switched connection with another device on the PSTN. The mobile station 50 may then send voice traffic to the other device over this connection; however, the mobile station may also send data over this type of connection. Other types of circuit-switched connections may be used.

It should be understood, however, that the wireless networks depicted in FIGS. 2 and 3 are merely exemplary in nature. For example, it is not necessary that the first radio network 52 is a WLAN 98, and it is not necessary that the second wireless network is a wireless telecommunications network. Rather, the first and second radio networks may be any type of radio network. Also, it is not necessary that one particular radio network have a large coverage area than the other radio network. Further, it is not necessary that the mobile station 50 be capable of communicating with two radio networks. In alternate embodiments, the mobile station 50 may be capable of communicating with a greater or fewer number of radio networks.

Figure 4:
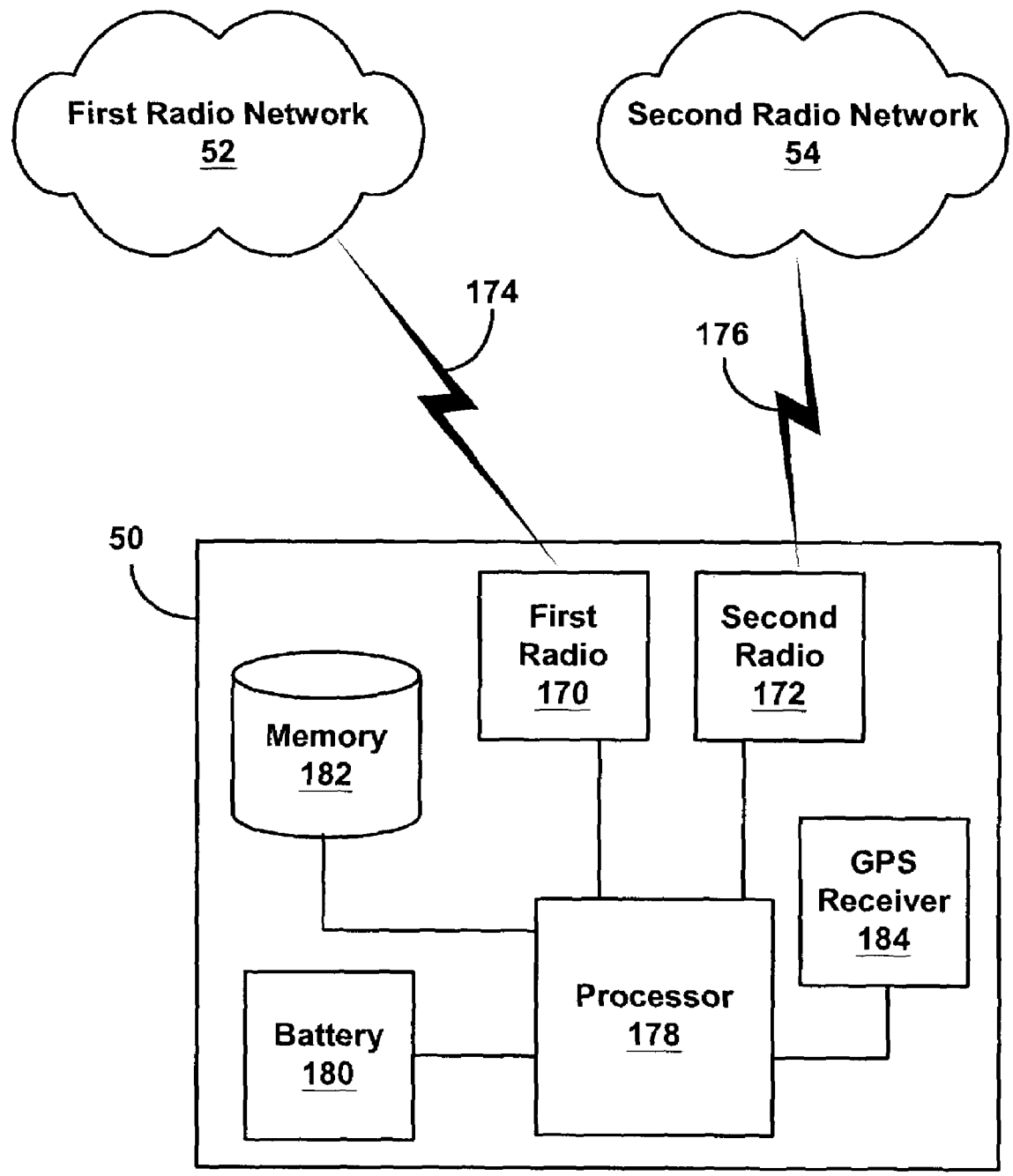
FIG. 4 is a block diagram illustrating exemplary components in the mobile station that can be used to communicate with the first and second radio networks of FIG. 1.

FIG. 4 is a block diagram illustrating exemplary components in the mobile station that can be used to communicate with the first and second radio networks of FIG. 1. As shown in FIG. 4, the mobile station 50 includes a first radio 170 for communicating with the first radio network 52 via a first wireless interface 174. The mobile station 50 also includes a second radio 172 for communicating with the second radio network 54 via a second wireless interface 176. The radios may vary with the types of the first and second radio networks 52, 54.

As previously described, in one exemplary embodiment the first radio network 52 is an WLAN 98 and the second radio network 54 is a WWAN. Thus, the first radio 170 may be an 802.11 radio and the second radio 172 may be a WWAN radio. Thus, the first wireless interface 174 may be the 802.11 interface 102 depicted in FIG. 2, and the second wireless interface 176 may be the air interface 152 of FIG. 3. However, the particular types of wireless interfaces 174, 176 may vary with the types of radio networks.

The radios 170, 172 may be separate components in the mobile station 50. For example, they may be separate application specific integrated circuits ("ASICs"), antenna systems or other separate components. Alternatively, the radios 170, 172 may be integrated into a single ASIC, such as a dual mode ASIC. The radios 170, 172 may also be integrated into a single component in the mobile station 50 other than an ASIC. Although FIG. 4 depicts two radios 170, 172 in the mobile station 50, the mobile station 50 may include a greater or fewer number of radios. Thus, the mobile station 50 may communicate with a greater or fewer number of radio networks.

In one exemplary embodiment, the second radio 172 is a WWAN card. Once connected to the mobile station 50, the mobile station 50 can use the WWAN card to communicate with a WWAN. The WWAN card may further be a CDMA card, such as a Sprint PCS Wireless Web Modem™ Aircard 510 manufactured by Sierra Wireless, thereby allowing the mobile station 50 to communicate with a CDMA network. CDMA is merely exemplary in nature, and the WWAN card may support other wireless protocols.

The WWAN may connect to the mobile station 50 in a variety of different ways. For example, the WWAN may connect to the mobile station 50 through a serial port, a parallel port, a Personal Computer Memory Card International Association ("PCMCIA") slot, a Universal Serial Bus ("USB") port or another type of connection.

In another exemplary embodiment, the first radio 170 is an WLAN card capable of communicating using the IEEE 802.11 protocol. The WLAN card may connect to the mobile station 50 using any of the previously described methods. The mobile station can use the WLAN card to access the WLAN 98. The WLAN card is merely exemplary in nature, and the mobile station may include a card that can communicate with other types of radio networks.

As illustrated in FIG. 4, a processor 178 connects to the first radio 170 and second radio 172 and may control their operation. The processor 178 may additionally control the operation of other components in the mobile station 50. The processor 178 may further interface with a battery 180, which supplies power to the processor 178 and other components in the mobile station 50. The processor 178 may also connect to memory 182, which can store programs, data or other information used by the processor 178. The processor may also connect to a GPS receiver 184, which the mobile station 50 can use to determine its present GPS position.

In order to conserve the battery 180, the mobile station 50 may power-down the radios 170, 172 when the mobile station 50 is not communicating with their respective radio networks 52, 54. For example, the mobile station 50 may power-down the WWAN radio 172 when the mobile station 50 is not communicating with the second radio network 54. Similarly, the mobile station 50 may power-down the radio 170 when the mobile station 50 is not communicating with the first radio network 52. Even when the radios 170, 172 are included in a single chip, they may be separately powered-up and powered-down. In order to later access one of the networks, the mobile station 50 can then power-up the corresponding radio. For example, the mobile station 50 can power-up the first radio 170 to access the first radio network 52, and it can power-up the second radio 172 to access the second radio network 54.

As previously described, it may be preferable for the mobile station 50 to communicate with the first radio network 52 instead of communicating with the second radio network 54. For example, when the first radio network 52 is an 802.11 WLAN and the second radio network 54 is a wireless telecommunications network, the 802.11 WLAN may provide higher data rates than the wireless telecommunications network. Additionally, the mobile station 50 may incur lower costs for accessing the 802.11 WLAN than the wireless telecommunications network. Thus, when available, it would be preferable for the mobile station 50 to communicate with the 802.11 WLAN.

When the mobile station 50 is not currently communicating with the first radio network 52, the mobile station 50 may want to check for the availability of the first radio network 52. The mobile station 50 can check for the availability of the first radio network 52, for example, by powering-up the first radio 170 in the mobile station 50. Then, using the first radio 170, the mobile station 50 can attempt to access the first radio network 52. If the mobile station 50 successfully accesses the first radio network 52, then the mobile station 50 can communicate with the first radio network 52. If the mobile station 50 is not successful, the mobile station 50 may power-down the first radio 52. The mobile station 50 may at a later time again try to communicate with the first radio network 52.

Powering-up and powering-down the radio in the mobile station 50 consumes battery power. Thus, powering-up the radio at periodic intervals in order to determine the availability of the first radio network 52 can more rapidly deplete the mobile station's battery. In order to conserve the mobile station's battery, the mobile station 50 may make a preliminary determination whether the mobile station 50 may be in range of the first radio network 52 prior to powering-up the first radio 170. If the mobile station 50 preliminarily determines that it may be in range of the first radio network 52, the mobile station may then power-up the first radio 170 and attempt to communicate with the first radio network 52.

2. Exemplary Operation

The mobile station 50 may use a database to make a preliminary determination whether the mobile station 50 may be within range of the first radio network 52. The database may correlate, for example, various positions of the mobile station 50 with a coverage area of the first radio network 52. The mobile station 50 may first determine its location. This may be done, for example, using an existing connection with the second radio network 54. Alternatively, the mobile station 50 may use the GPS receiver 184 in the mobile station 50, or another method, to determine its location.

Using its location, the mobile station 50 may then access the database in order to determine whether the mobile station 50 might be in range of a first radio network 52. After accessing the database, if the mobile station 50 determines that it is likely within range of the first radio network 52, then the mobile station may power-up the radio 170 and attempt to communicate with the first radio network 52. By only powering-up the radio 170 when the mobile station 50 determines it is likely within range of the first radio network 52, the mobile station 50 can conserve battery power that would otherwise be expended by periodically powering-up the radio 170 to check for the availability of the first radio network 52.

Figure 5:
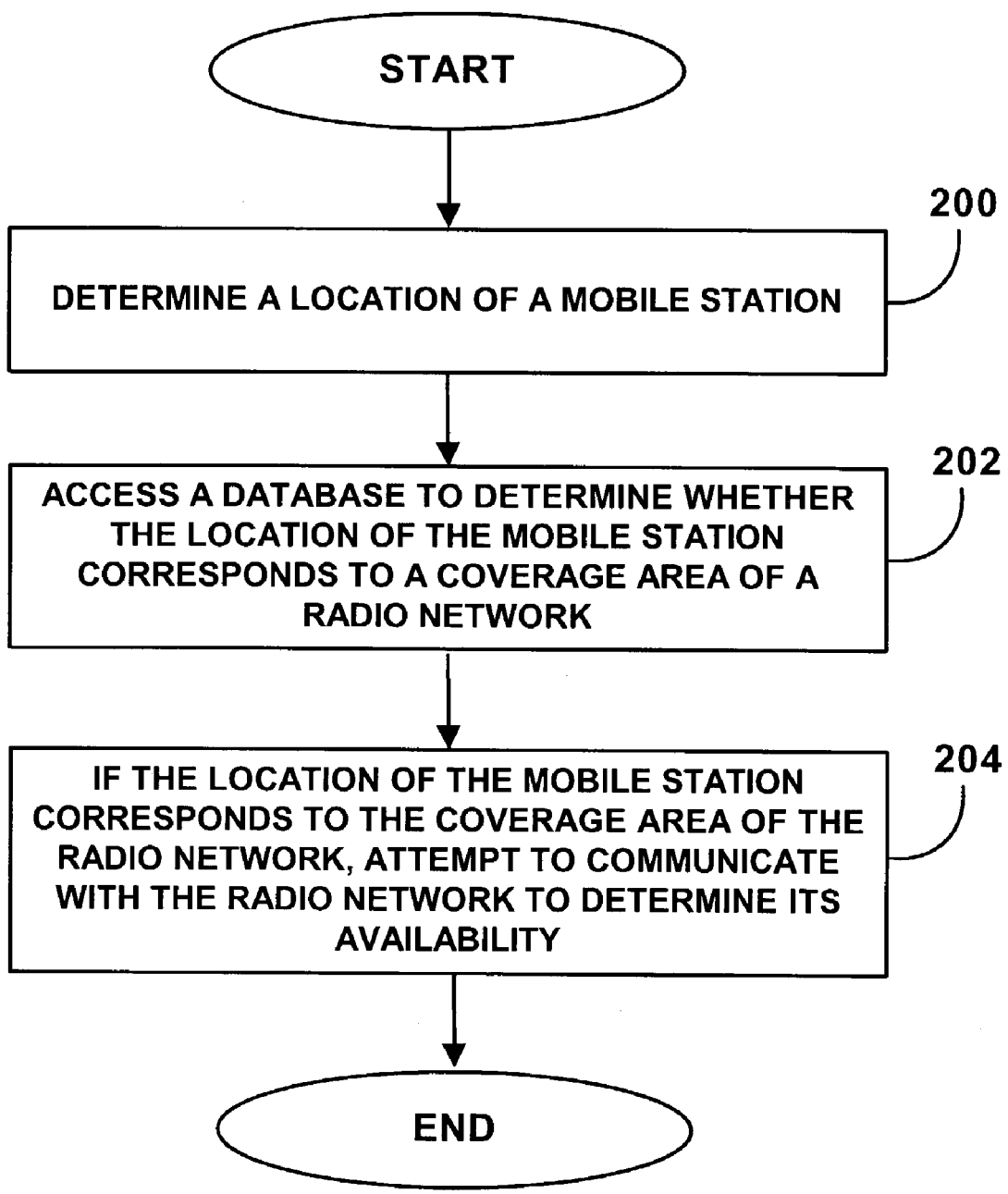
FIG. 5 is a flowchart of an exemplary process that can be used to determine the availability of a radio network.

FIG. 5 is a flowchart of an exemplary process that can be used to determine the availability of a radio network. At Step 200, a mobile station determines its location. This can be done using a variety of different methods. For example, the mobile station 50 may include a GPS receiver 184, which the mobile station 50 can use to obtain its GPS location. In another example, the mobile station 50 may use a satellite-based location system other than GPS. It is not necessary, however, that the mobile station 50 use a satellite-based location system. The mobile station may use various other non-satellite-based or non-coordinate-based location systems.

Then, at Step 202, the mobile station accesses a database to determine whether the mobile station's location corresponds to a coverage area of a radio network. The database may, for example, correlate the location of the mobile station 50 with the coverage area of the first radio network 52. The mobile station 50 may then use its location to access the database and determine if the location corresponds to the coverage area of the first radio network 52.

The database may use a variety of different methods to correlate the location of the mobile station 50 with the coverage area of the first radio network 52. In one method, the database may store a direct mapping of physical locations to the coverage area of the first radio network 52. For example, the database may correlate GPS positions with the coverage area of the first radio network 52. Using a GPS position, the mobile station 50 may access the database to determine if the database stores a direct mapping between the GPS position and the coverage area of the first radio network 52. If the database stores a mapping, the mobile station 50 may be notified that it is within the coverage area of the first radio network 52. If the database does not include a mapping, the mobile station 50 may be notified that it is not within the coverage area of the first radio network 52.

As many coordinate-based location systems offer a high degree of precision, it is unlikely that a database would be programmed to store every possible coordinate-based location that corresponds to a coverage area of the first radio network 52. The database, however, may store selected coordinate-based locations throughout the coverage area of the first radio network 52. When the mobile station 50 provides a coordinate-based location to the database, the database can determine if the coordinate-based location provided by the mobile station 50 is within a specified distance of selected coordinates-based location stored in the database. If the coordinate-based location provided by the mobile station 50 is within the specified distance of a coordinate-based location stored in the database, then the database may notify the mobile station 50 that it is within range of the first radio network 52.

In yet another embodiment, the database may store boundaries of the coverage area of the first radio network 52. For example, the database may store longitudes and latitudes that outline the boundaries of the coverage area of the first radio network 52. In another example, the database may store coordinates that connect to form the boundaries of the coverage area of the first radio network 52. The mobile station 50 can access the database and provide a single coordinate-based location. The database can then determine whether the coordinate-based location provided by the mobile station 50 is within the boundary of the coverage area of the mobile station 50. The database may then notify the mobile station 50 whether it is within the coverage area of the first radio network 52.

The database may be stored at a variety of different locations. For example, the mobile station 50 may store the database, such as in the memory 182. In another example, the second radio network 54 may store the database. The database may be stored in a variety of different locations on the second radio network, such as in one or more components accessible on the second radio network 54. In yet another example, the database may be stored on another network accessible via the second radio network 54. In another embodiment, the database may be distributed among multiple different locations. For example, the database may be distributed among the mobile station 50 and second radio network 54. In other embodiments, data storage mechanisms other than a database, such as a data file, may be used.

At Step 204, if the location of the mobile station corresponds to a coverage area of the radio network, the mobile station attempts to communicate with the radio network in order to determine its availability. Thus, after the mobile station 50 accesses the database and determines that the mobile station 50 is likely within range of the first radio network 52, the mobile station 50 can attempt to communicate with the first radio network 52. For example, the mobile station 50 can power-up the radio 170 and attempt to communicate with the first radio network 52. In the WLAN of FIG. 2, for example, the mobile station 50 may attempt to associate with the AP 100. In the wireless telecommunications network of FIG. 3, the mobile station 50 may attempt to establish a radio link with the base station 150.

Figure 6:
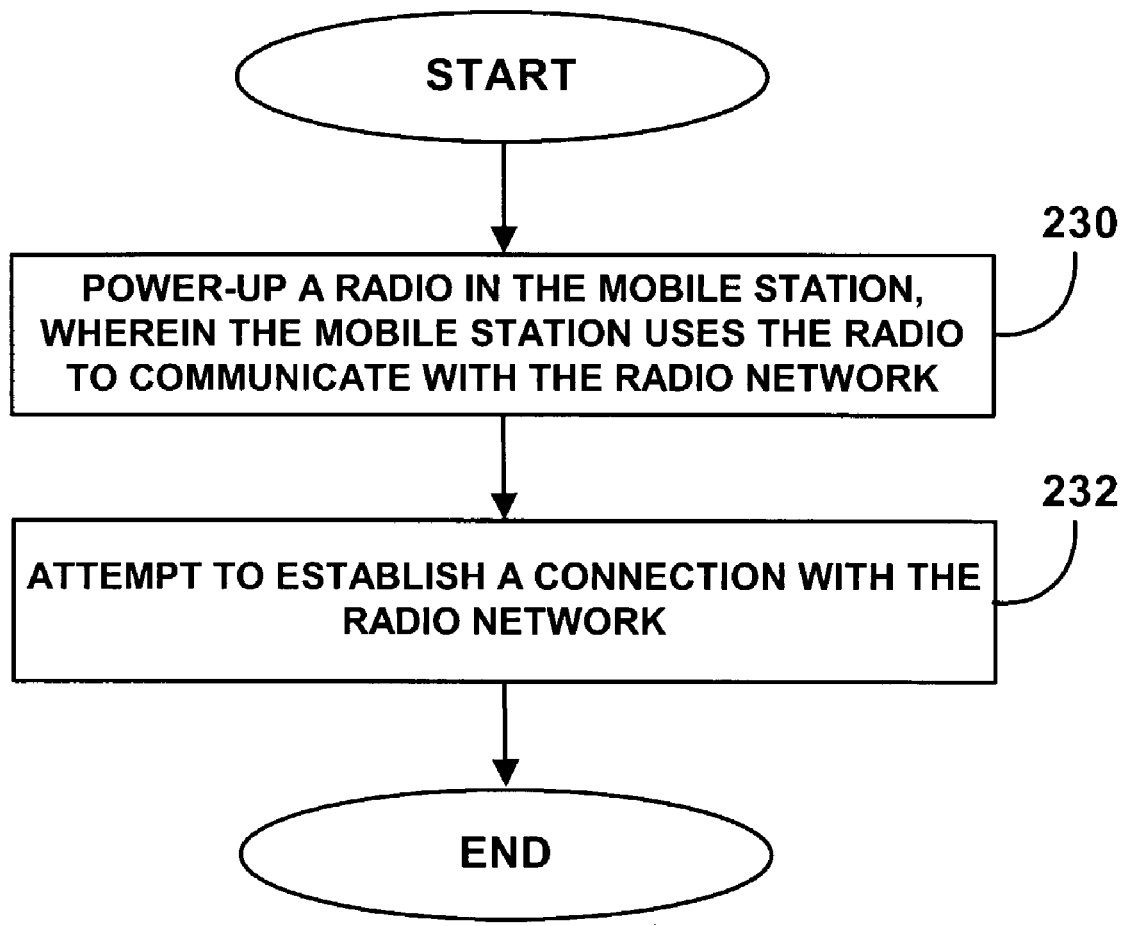
FIG. 6 is a flowchart of an exemplary process that the mobile station can use to attempt to communicate with the radio network, thereby determining the radio network's availability.

FIG. 6 is a flowchart of an exemplary process that the mobile station can use to attempt to communicate with the radio network, thereby determining the radio network's availability. The process depicted in FIG. 6 may be used, for example, as Step 204 of FIG. 5. At Step 230, the mobile station powers up a radio in the mobile station that the mobile station uses to communicate with the radio network. Next, at Step 232, the mobile station uses the radio to attempt to establish a connection with the radio network. If the mobile station is successful in establishing the connection, then the radio network is available and the mobile station can begin communicating with the radio network. If the mobile station is not successful in establishing the connection, then the mobile station determines that the radio network is not available.

Figure 7:
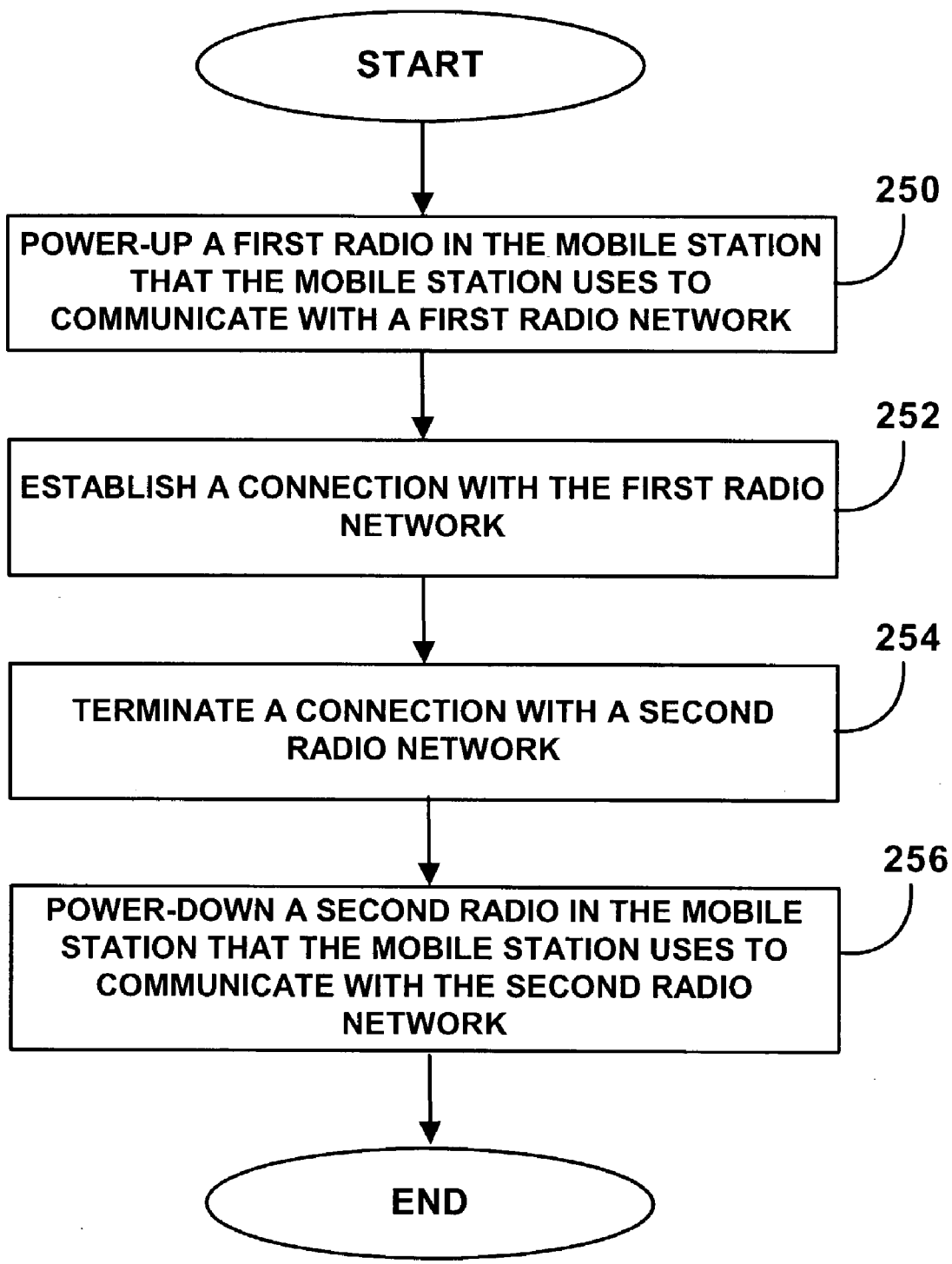
FIG. 7 is a flowchart of an exemplary process that the mobile station can use to attempt to communicate with the radio network, in which the mobile station successfully establishes a connection with the radio network.

FIG. 7 is a flowchart of an exemplary process that the mobile station can use to attempt to communicate with the radio network, in which the mobile station successfully establishes a connection with the radio network. The process depicted in FIG. 7 may be used, for example, as Step 204 of FIG. 5. At Step 250, the mobile station powers-up a first radio in the mobile station that the mobile station uses to communicate with a first radio network. Then, at Step 252 the mobile station establishes a connection with the first radio network. At Step 254, the mobile station terminates a connection with a second radio network. Finally, at Step 256, the mobile station powers-down a second radio in the mobile station that the mobile station uses to communicate with the second radio network.

Many variations are possible. For example, the mobile station 50 may not be previously communicating with the second radio network. Thus, after establishing a connection with the first radio network, the mobile station 50 would not have to terminate a connection with the second radio network and power-down a second radio used to communicate with the second radio network. Therefore, in one alternate embodiment the mobile station would not perform Steps 254 and 256. In another variation, the mobile station 50 may be communicating with the second radio network, but may decide to keep the previously established connection with the second radio network even after establishing a connection with the first radio network. Therefore, in this alternate embodiment, the mobile station 50 would also not perform Steps 254 and 256.

Figure 8:
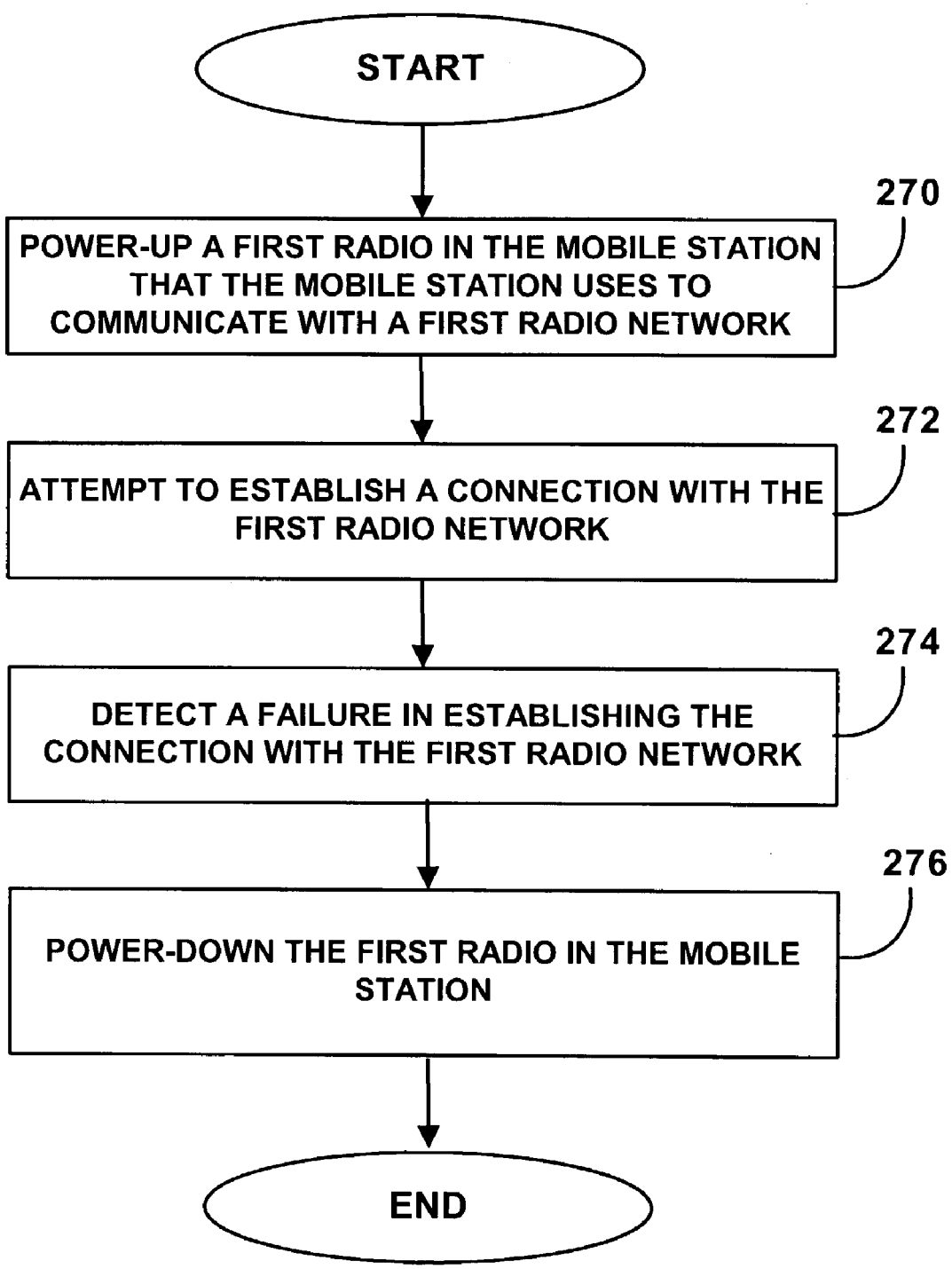
FIG. 8 is a flowchart of an exemplary process that the mobile station can use to attempt to communicate with a first radio network, in which the mobile station does not successfully establish a connection with the first radio network.

FIG. 8 is a flowchart of an exemplary process that the mobile station can use to attempt to communicate with a first radio network, in which the mobile station does not successfully establish a connection with the first radio network.

The process depicted in FIG. 8 may be used, for example, as Step 204 of FIG. 5. At Step 270, the mobile station powers-up a first radio in the mobile station. Next, at Step 272, the mobile station uses the first radio to attempt to establish a connection with the first radio network. Since the first radio network is not available, the mobile station will not be able to establish a connection with the radio network. At Step 274, the mobile station detects a failure in establishing the connection with the first radio network. Then, the mobile station powers-down the first radio, as shown at Step 276. The mobile station may then repeat the process when it again determines that it may be in range of the first radio network.

Figure 9:
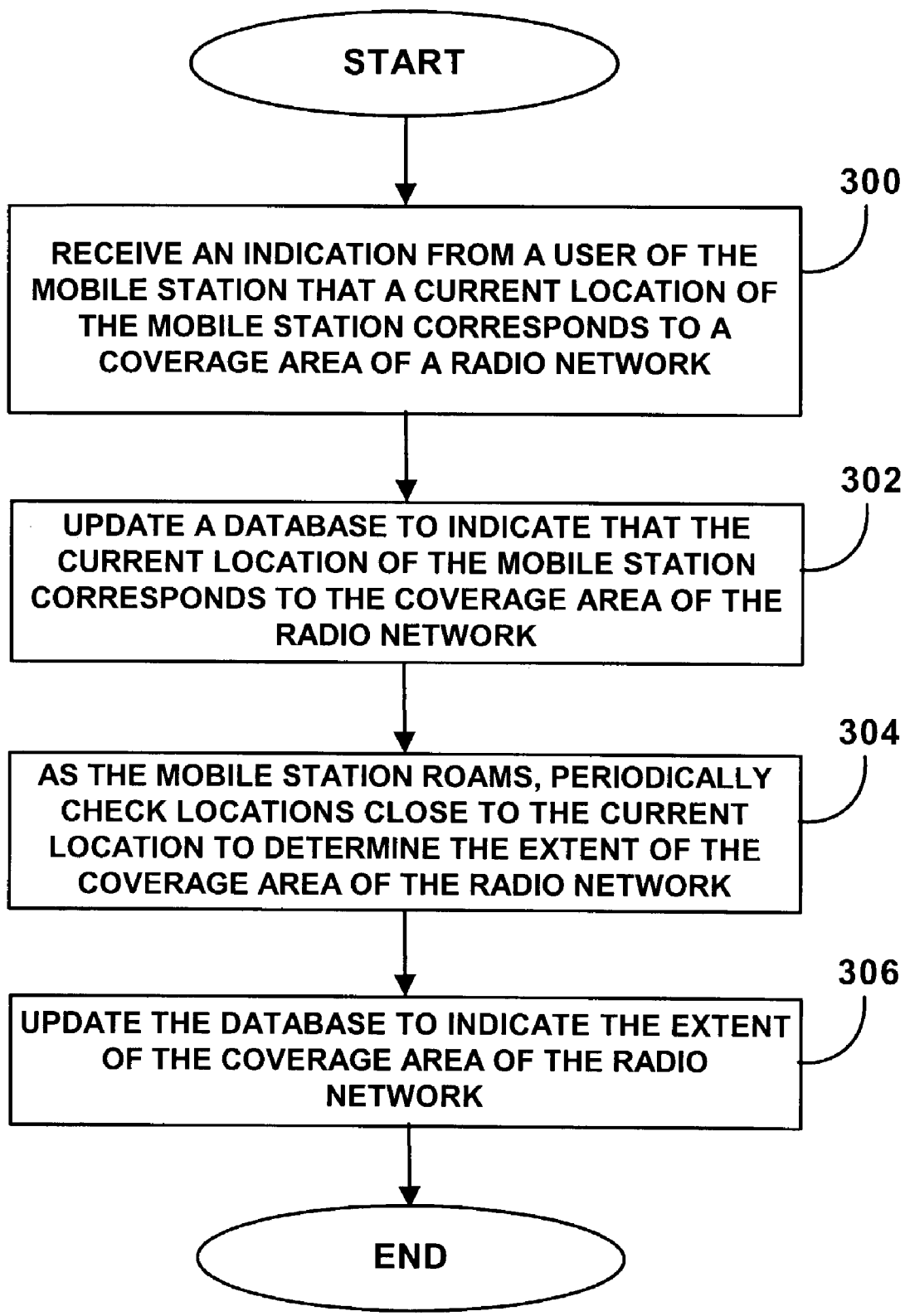
FIG. 9 is a flowchart of an exemplary process that the mobile station can use to program the database with the coverage area of a radio network.

FIG. 9 is a flowchart of an exemplary process that the mobile station can use to program the database with the coverage area of a radio network. For example, the user of the mobile station may know specific radio networks that the user is likely to access through the mobile station 50. For example, the user may routinely access radio networks located at the user's home, office or another location. Thus, it would be advantageous to provide the user with a mechanism for programming this information into the database so that the mobile station 50 can more easily detect when it is within range of one or more of these radio networks.

The process described in FIG. 9 can be used to allow the user to program the database with information regarding specific radio networks. At Step 300, the mobile station receives an indication from a user of the mobile station that a current location of the mobile station corresponds to a coverage area of a radio network. For example, the user may be using the mobile station 50 at a location that the user knows is covered by a radio network, such as the user's home, office or another location. The user can then provide an indication to the mobile station 50 that the location is within the coverage area of a radio network. The user may provide the indication to the mobile station 50 in a variety of different manners, such as by using a keypad or other input device on the mobile station. For example, the user may enter a feature code, such as "##69", in order to bookmark the location in the database as one corresponding to a coverage area of the radio network.

In response, the mobile station updates a database to indicate that the current location of the mobile station corresponds to the coverage area of the radio network, as shown at Step 302. For example, in response to the user's indication, the mobile station 50 may obtain the current location of the mobile station 50 in a coordinate-based location system, such as by obtaining a GPS location of the mobile station. The mobile station 50 may also determine its location using a non-coordinate-based location system. The mobile station 50 can then access the database and update the database to indicate that the mobile station's location corresponds to the coverage area of the radio network.

As part of bookmarking the current location of the mobile station 50 as one that corresponds to the coverage area of the radio network, the mobile station 50 may indicate to the database that other locations within a predetermined distance of the current location of the mobile station 50 should also correspond to the coverage area of the radio network. The user may define the predetermined distance. For example, the user may define a default distance to be used each time the user bookmarks a location. A user may optionally specify a different distance with a particular bookmark. In an alternate embodiment, the predetermined distance may be set by the database and cannot be changed by the user.

In addition to bookmarking the current location of the mobile station 50 as one that corresponds to the coverage area of the radio network, the mobile station 50 may also automatically attempt to determine the boundaries of the coverage area. As the mobile station 50 roams, it can periodically check locations close to the current location to determine the extent of the coverage area of the radio network, as shown at Step 304. This may be done automatically without further input from the user. Thus, once the user indicates that the mobile station 50 is within range of a radio network, the mobile station 50 may automatically check location close to the inputted location in order to determine the extent of the coverage area of the radio network. The mobile station can then update the database to indicate the extent of the coverage area of the radio network, as shown at Step 306.

In one example implementation of the process of FIG. 9, the user may take the mobile station 50 to the user's office. Since the user know that the user's office is covered by a radio network, the user may then provide the mobile station 50 with an indication to update the database to reflect the mobile station's current location as one that is covered by the radio network. As the user moves the mobile station 50 around the office, the mobile station 50 may automatically detect whether the new locations are also covered by the radio network. Thus, the mobile station 50 can automatically check other locations within the office, or potentially outside the office, to more accurately map the coverage area of the radio network.

The mobile station 50 may do this, for example, by testing various locations within a specified distance of the first location. Where the mobile station 50 determines that a new location also corresponds to the coverage area of the radio network, the mobile station may also automatically test locations within a specified distance of that location and so on. Also, the mobile station 50 may continually check locations so long as the mobile station remains connected to the radio network. As the mobile station 50 determines new locations that do or do not correspond to the coverage area of the radio network, the mobile station 50 may automatically update the database.

The process depicted in FIG. 9 is merely exemplary in nature, and many variations may be made. For example, it is not necessary that the mobile station 50 auto-detect other locations in order to determine the extent of the coverage area of the radio networks. Thus, in one alternate embodiment the mobile station 50 only performs Steps 300 and 302 of FIG. 9.

In another example, the database may be preprogrammed with data indicating the coverage area of the radio network. The user may use the process described in FIG. 9 to supplement the preprogrammed data in the database. In another example, the database may be preprogrammed with data indicating the coverage area of the radio network, but the user is not able to supplement the data. Thus, the user would not be able to use the process described in FIG. 9. Other ways also exists to program the database, and these may also be used.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for determining a coverage area of a radio network, the method comprising:
   determining a location of a mobile station;
   accessing a database to determine whether the location of the mobile station corresponds to the coverage area of the radio network; and
   if the database indicates that the location of the mobile station corresponds to the coverage area of the radio network, attempting to communicate with the radio network to determine an availability of the radio network.

2. A computer readable medium having stored therein instructions for causing a processing unit to execute the method of claim 1.

3. The method of claim 1, wherein determining the location of the mobile station comprises determining the location of the mobile station using a coordinate-based location system.

4. The method of claim 1, wherein determining the location of the mobile station comprises using a GPS receiver in the mobile station to determine a GPS location of the mobile station.

5. The method of claim 1, further comprising:
   receiving from a user of the mobile station an indication that the location of the mobile station corresponds to the coverage area of the radio network; and
   updating the database to reflect that the location of the mobile station corresponds to the coverage area of the radio network.

6. The method of claim 5, wherein updating the database further comprises updating the database to reflect that locations within a predetermined distance of the location of the mobile station correspond to the coverage area of the radio network.

7. The method of claim 5, further comprising:
   at a plurality of different locations, determining whether the mobile station is within the coverage area of the radio network; and
   updating the database to include locations in the plurality of different locations that are within the coverage area of the mobile station.

8. The method of claim 1, further comprising:
   successfully communicating with the radio network; and
   responsively terminating a communication link with a second radio network.

9. The method of claim 8, wherein the mobile station uses a first radio in the mobile station to communicate with the radio network, wherein the mobile station uses a second radio in the mobile station to communicate with the second radio network, and wherein switching from communicating with the second radio network to communicating with the radio network comprises:
   powering-up the first radio in the mobile station;
   establishing a connection with the radio network;
   terminating a connection with the second radio network; and
   powering-down the second radio in the mobile station.

10. The method of claim 8, wherein the second radio network is a wireless telecommunications network.

11. The method of claim 1, wherein the mobile station stores the database.

12. The method of claim 1, wherein the radio network is an 802.11 network, a HomeRF network, a HiperLAN or a Bluetooth network.

13. A method for determining the availability of a first radio network, the method comprising:
   determining a location of a mobile station;
   accessing a database and using the location of the mobile station to determine whether the location is within a coverage area of the first radio network, wherein the database correlates a plurality of different locations of the mobile station with the coverage area of the first radio network; and
   if the database indicates that the mobile station is within the coverage area of the first radio network, attempting to communicate with the first radio network.

14. A computer readable medium having stored therein instructions for causing a processing unit to execute the method of claim 13.

15. The method of claim 13, wherein determining a location of the mobile station comprises determining the location of the mobile station using a satellite-based location system.

16. The method of claim 13, further comprising:
   receiving an indication from a user of the mobile station that the mobile station is within the coverage area of the first radio network; and
   updating the database to indicate that the location of the mobile station is within the coverage area of the first radio network.

17. The method of claim 16, further comprising:
   updating the database to indicate that locations within a predetermined distance of the location of the mobile station are also within the coverage area of the first radio network.

18. The method of claim 16, further comprising:
   for each of a plurality of locations within a predetermined distance of the location of the mobile station, attempting to communicate with the first radio network; and
   for locations within the plurality of locations at which the mobile station successfully communicates with the first radio network, updating the database to indicate that the locations are within the coverage area of the first radio network.

19. The method of claim 13, further comprising:
   powering-up a first radio in the mobile station, wherein the mobile station uses the first radio to communicate with the first radio network;
   establishing a communication link with the first radio network; and
   powering-down a second radio in the mobile station, wherein the mobile station uses the second radio to communicate with the second radio network.

20. The method of claim 19, wherein the first radio network is an IEEE 802.11a, IEEE 802.11b or IEEE 802.11g radio network, and wherein the second radio network is a wireless telecommunications network.

21. The method of claim 13, wherein the mobile station is a mobile phone, a two-way radio, a two-way pager or a computer.

22. A method for a mobile station to switch between using a wireless first radio in the mobile station to communicate with a wireless telecommunications network and using a second radio in the mobile station to communicate with a radio network, the method comprising:

using the first radio to communicate with the wireless telecommunications network;

determining a current location of the mobile station;

using a database to determine whether the current location of the mobile station corresponds to a coverage area of the radio network; and if the current location of the mobile station corresponds to the coverage area of the radio network:

(i) powering-up the second radio in the mobile station;

(ii) establishing a connection with the radio network;

(iii) terminating a connection with the wireless telecommunications network; and (iv) powering-down the first radio in the mobile station.

23. A computer readable medium having stored therein instructions for causing a processing unit to execute the method of claim 22.

24. The method of claim 22, wherein the mobile station is a mobile phone, a two-way radio, a two-way pager or a computer.

25. The method of claim 22, wherein the wireless telecommunications network is a CDMA, TDMA or GSM network.

26. The method of claim 22, wherein the radio network is an 802.11 network, a HomeRF network, a HiperLAN or a Bluetooth network.

* * * * *